United States Patent
Sakamoto et al.

(10) Patent No.: US 7,843,796 B2
(45) Date of Patent: Nov. 30, 2010

(54) OPTICAL INFORMATION RECORDING MEDIUM AND METHOD OF MARKING BCA (BURST CUTTING AREA) INTO THE SAME

(75) Inventors: Tetsuhiro Sakamoto, Kanagawa (JP); Jun Nakano, Tokyo (JP); Yuki Tauchi, Hyogo (JP); Junichi Nakai, Hyogo (JP)

(73) Assignees: Sony Corporation, Tokyo (JP); Kobe Steel, Ltd., Hyogo (JP)

( * ) Notice: Subject to any disclaimer, the term of this patent is extended or adjusted under 35 U.S.C. 154(b) by 520 days.

(21) Appl. No.: 11/748,739

(22) Filed: May 15, 2007

(65) Prior Publication Data
US 2009/0022044 A1    Jan. 22, 2009

(30) Foreign Application Priority Data
May 16, 2006   (JP)   ............................. 2006-136900
Oct. 2, 2006   (JP)   ............................. 2006-270996

(51) Int. Cl.
*G11B 7/24* (2006.01)
(52) U.S. Cl. ................. 369/275.3; 369/275.4; 428/64.4
(58) Field of Classification Search ... 369/275.1–275.5, 369/288, 100, 30.25, 53.21, 47.19, 47.21, 369/47.22, 59.23, 59.25; 428/64.2, 64.4; 720/718; 714/769, 770
See application file for complete search history.

(56) References Cited

U.S. PATENT DOCUMENTS

| | | | |
|---|---|---|---|
| 5,948,497 A | 9/1999 | Hatwar et al. | |
| 6,007,889 A | 12/1999 | Nee | |
| 6,280,811 B1 | 8/2001 | Nee | |
| 6,451,402 B1 | 9/2002 | Nee | |
| 6,689,444 B2 | 2/2004 | Nakai et al. | |
| 7,022,384 B2 | 4/2006 | Fujii et al. | |
| 7,200,102 B2 * | 4/2007 | Irie et al. | 369/275.3 |
| 7,203,003 B2 | 4/2007 | Nakai et al. | |

(Continued)

FOREIGN PATENT DOCUMENTS

JP    04-028032    1/1992

(Continued)

OTHER PUBLICATIONS

Japanese Office Action issued on Jun. 2, 2009 in connection with JP Application No. 2006-270996.

*Primary Examiner*—Ali Neyzari
(74) *Attorney, Agent, or Firm*—SNR Denton US LLP

(57) ABSTRACT

An optical information recording medium includes a read-only information recording portion, and a BCA (Burst Cutting Area) portion formed by laser marking. A reflective film on an information recording surface of the read-only information recording portion and a reflective film on the BCA portion are formed of the same material. The reflective film includes Ag as a main component, and at least one of Nd and Gd, and at least one of Sn and In as components; the reflective film including at least one of Nd and Gd of 0.1 atom % or more and 3.0 atom % or less in total and at least one of Sn and In of 3 atom % or more and 12 atom % or less in total. Recorded information is reproduced from the information recording surface of the read-only information recording portion and a BCA signal is reproduced from the BCA portion, using blue-violet laser reproducing light.

8 Claims, 15 Drawing Sheets

U.S. PATENT DOCUMENTS

| | | | |
|---|---|---|---|
| 7,376,070 B2 * | 5/2008 | Sakaue et al. | 369/275.3 |
| 7,419,711 B2 | 9/2008 | Tauchi et al. | |
| 7,452,604 B2 | 11/2008 | Takagi et al. | |
| 7,476,431 B2 | 1/2009 | Tauchi et al. | |
| 7,507,458 B2 | 3/2009 | Takagi et al. | |
| 7,514,037 B2 | 4/2009 | Tauchi et al. | |
| 7,517,575 B2 | 4/2009 | Fujii et al. | |
| 7,566,417 B2 | 7/2009 | Tauchi et al. | |
| 7,624,331 B2 * | 11/2009 | Kobayashi et al. | 714/769 |
| 2002/0034603 A1 | 3/2002 | Nee | |
| 2002/0122913 A1 | 9/2002 | Nee | |
| 2003/0138591 A1 | 7/2003 | Nee | |
| 2003/0215598 A1 | 11/2003 | Nee | |
| 2004/0018334 A1 | 1/2004 | Nee | |
| 2004/0151866 A1 | 8/2004 | Nee | |
| 2004/0151867 A1 | 8/2004 | Nee | |
| 2004/0191463 A1 | 9/2004 | Nee | |
| 2004/0226818 A1 | 11/2004 | Takagi et al. | |
| 2004/0238356 A1 | 12/2004 | Matsuzaki | |
| 2004/0239134 A1 | 12/2004 | Fukazawa | |
| 2004/0258872 A1 | 12/2004 | Nee | |
| 2005/0042406 A1 | 2/2005 | Nee | |
| 2005/0112019 A1 | 5/2005 | Nakai | |
| 2005/0153162 A1 | 7/2005 | Takagi | |
| 2005/0170134 A1 | 8/2005 | Nee | |
| 2005/0238839 A1 | 10/2005 | Takagi | |
| 2005/0260663 A1 | 11/2005 | Solomon | |
| 2006/0013988 A1 | 1/2006 | Tauchi | |
| 2006/0171842 A1 | 8/2006 | Tauchi | |
| 2006/0177768 A1 | 8/2006 | Tauchi et al. | |
| 2006/0182991 A1 | 8/2006 | Tauchi | |
| 2007/0020139 A1 | 1/2007 | Tauchi | |
| 2007/0020426 A1 | 1/2007 | Nakai | |
| 2007/0141296 A1 | 6/2007 | Nakano | |
| 2008/0075910 A1 | 3/2008 | Ohwaki | |
| 2008/0131308 A1 | 6/2008 | Tsubota | |
| 2008/0317993 A1 | 12/2008 | Tauchi | |
| 2009/0022044 A1 | 1/2009 | Sakamoto et al. | |
| 2009/0057140 A1 | 3/2009 | Takagi | |
| 2009/0057141 A1 | 3/2009 | Tauchi | |
| 2009/0061142 A1 | 3/2009 | Tauchi | |
| 2009/0075109 A1 | 3/2009 | Tauchi | |
| 2009/0139860 A1 | 6/2009 | Matsuzaki | |
| 2010/0038233 A1 | 2/2010 | Takagi | |
| 2010/0074094 A1 | 3/2010 | Sakamoto | |

FOREIGN PATENT DOCUMENTS

| | | |
|---|---|---|
| JP | 04-252440 | 9/1992 |
| JP | 05-258363 | 10/1993 |
| JP | 6-302027 | 10/1994 |
| JP | 2000-57627 | 2/2000 |
| JP | 2001-184725 | 7/2001 |
| JP | 2003-160826 | 6/2003 |
| JP | 2004-158145 | 6/2004 |
| JP | 2005-196940 | 7/2005 |
| JP | 2006-054032 | 2/2006 |
| JP | 2006-079717 | 3/2006 |
| WO | 9809823 | 12/1998 |

* cited by examiner

FIG. 6

| Sample No. | Composition | Reflectivity (%) | | | | Jitter Value (%) | | | | BCA Recording Power (W) |
|---|---|---|---|---|---|---|---|---|---|---|
| | | 0h | 100h | 200h | 300h | 0h | 100h | 200h | 300h | |
| 1 | Ag-0.7Nd-3Gd | 45.7 | 38.9 | 38.0 | | 5.0 | 4.9 | 5.3 | | >4.6 |
| 2 | Ag-0.7Nd-2.0Sn | 46.2 | 42.5 | 43.2 | 42.1 | 5.4 | 5.7 | 5.7 | 5.6 | >4.6 |
| 3 | Ag-0.7Nd-4.0Sn | 45.7 | 43.2 | 43.4 | 42.6 | 5.4 | 5.4 | 5.3 | 5.1 | 4.2 |
| 4 | Ag-0.5Bi-5.0Nd-4.0Sn | 44.9 | 34.2 | 31.6 | 28.5 | 5.3 | 4.7 | 4.8 | 4.9 | — |
| 5 | Ag-0.5Bi-0.7Nd-6.0Sn | 46.4 | 45.3 | 46.6 | 44.5 | 5.8 | 5.8 | 5.8 | 6.1 | 2.6 |
| 6 | Ag-0.7Nd-7.0Sn | 44.8 | 42.1 | 42.0 | 41.0 | 5.8 | 4.8 | 5.1 | 5.3 | 2.6 |
| 7 | Ag-0.7Nd-8.0Sn | 44.6 | 41.4 | 41.3 | 39.8 | 5.9 | 4.7 | 5.1 | 4.7 | 2.6 |
| 8 | Ag-0.7Nd-9.0Sn | 43.2 | 40.1 | 39.4 | 38.7 | 6.1 | 4.9 | 4.7 | 4.6 | 2.2 |
| 9 | Ag-0.7Nd-0.7Gd-5.06Sn | 46.9 | 45.2 | 44.3 | 44.5 | 5.3 | 4.6 | 5.1 | 4.7 | 1.8 |
| 10 | Ag-0.7Nd-0.7Gd-5.5Sn | 47.2 | 45.2 | 43.7 | 43.5 | 5.4 | 5.2 | 5.1 | 5.1 | 2.0 |
| 11 | Ag-0.7Nd-1.1Gd-5.5Sn | 46.2 | 43.6 | 42.5 | 42.3 | 5.3 | 4.7 | 4.6 | 4.7 | 1.8 |
| 12 | Ag-0.7Nd-1.5Gd-4.0Sn | 43.3 | 42.6 | 41.6 | 41.3 | 5.1 | 4.7 | 4.8 | 5.1 | <1.8 |
| 13 | Ag-0.7Nd-1.5Gd-5.0Sn | 42.4 | 41.3 | 40.2 | 40.4 | 5.1 | 4.8 | 4.6 | 5.1 | <1.8 |
| 14 | Ag-0.7Nd-2.0Gd-3.0Sn | 43.3 | 40.6 | 39.3 | 39.1 | 4.9 | 4.7 | 4.7 | 4.9 | 2.2 |
| 15 | Ag-0.7Nd-2.0Gd-4.0Sn | 41.3 | 38.1 | 37.3 | 37.4 | 5.1 | 4.7 | 4.6 | 5.1 | <1.8 |
| 16 | Ag-0.5Bi-0.7Nd-2.0Gd-4.0Sn | 41.3 | 38.1 | 37.5 | 37.6 | 5.1 | 4.7 | 4.8 | 5.0 | 1.8 |
| 17 | Ag-0.7Nd-2.0Gd-5.0Sn | 42.2 | 39.2 | 38.7 | 38.9 | 5.3 | 5.0 | 4.6 | 5.0 | <1.8 |
| 18 | Ag-0.7Nd-3.0Gd-2.0Sn | 42.2 | 35.2 | 33.1 | 32.8 | 5.1 | 4.7 | 4.6 | 5.1 | 2.6 |
| 19 | Ag-0.7Nd-0.7Gd-5.5Sn | 45.8 | 43.6 | 43.4 | 41.8 | 5.6 | 5.5 | 5.1 | 5.2 | 2.0 |
| 20 | Ag-0.4Nd-0.4Gd-5.5Sn | 45.9 | 43.4 | 43.4 | 42.0 | 5.3 | 5.1 | 4.9 | 5.1 | 2.2 |
| 21 | Ag-0.4Nd-0.7Gd-5.5Sn | 46.1 | 44.1 | 44.5 | 42.8 | 5.4 | 5.1 | 5.5 | 5.1 | 2.2 |
| 22 | Ag-0.4Nd-0.7Gd-5.5Sn-2.0Cu | 45.9 | 43.6 | 43.5 | 42.9 | 5.9 | 5.0 | 4.9 | 4.8 | 2.0 |
| 23 | Ag-0.4Nd-0.7Gd-5.5Sn-3.5Cu | 45.8 | 43.5 | 43.3 | 42.6 | 5.9 | 5.0 | 4.9 | 5.0 | 1.8 |

*FIG. 7A*
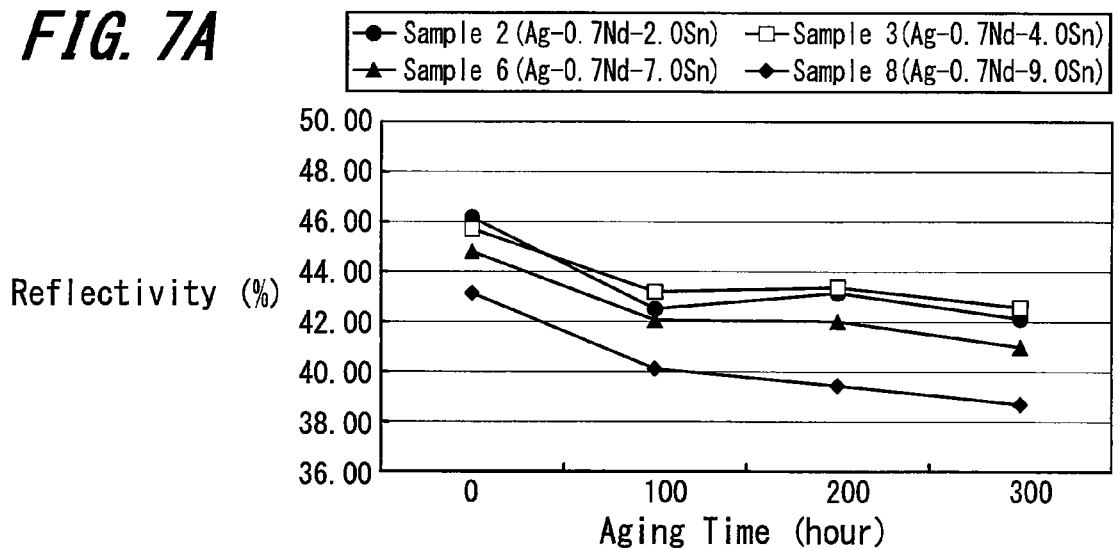
*FIG. 7B*
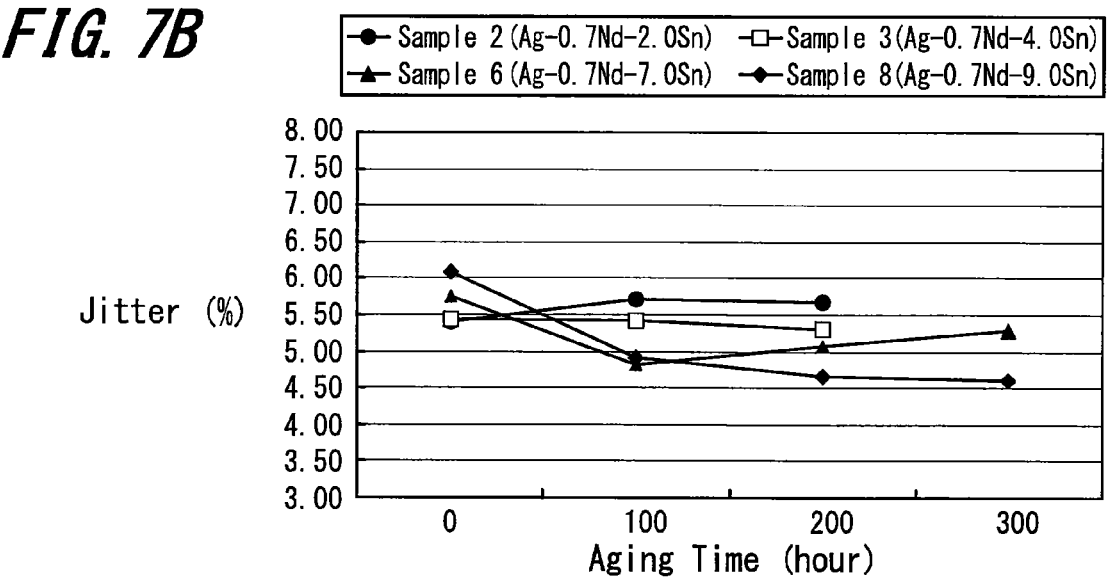
*FIG. 7C*
| Composition | BCA Sensitivity (power (W) @Err=0) |
|---|---|
| ●— Sample 2 (Ag-0.7Nd-2.0Sn) | >4.6 |
| ―□― Sample 3 (Ag-0.7Nd-4.0Sn) | 4.2 |
| ―▲― Sample 6 (Ag-0.7Nd-7.0Sn) | 2.6 |
| ―◆― Sample 8 (Ag-0.7Nd-9.0Sn) | 2.2 |

FIG. 9A
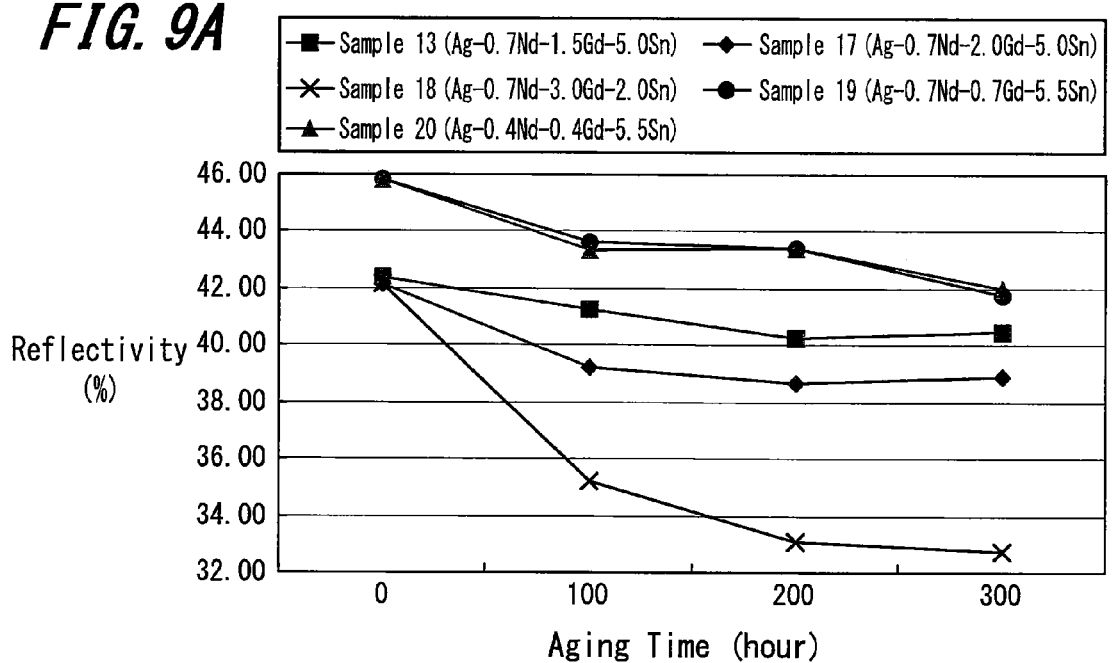
FIG. 9B
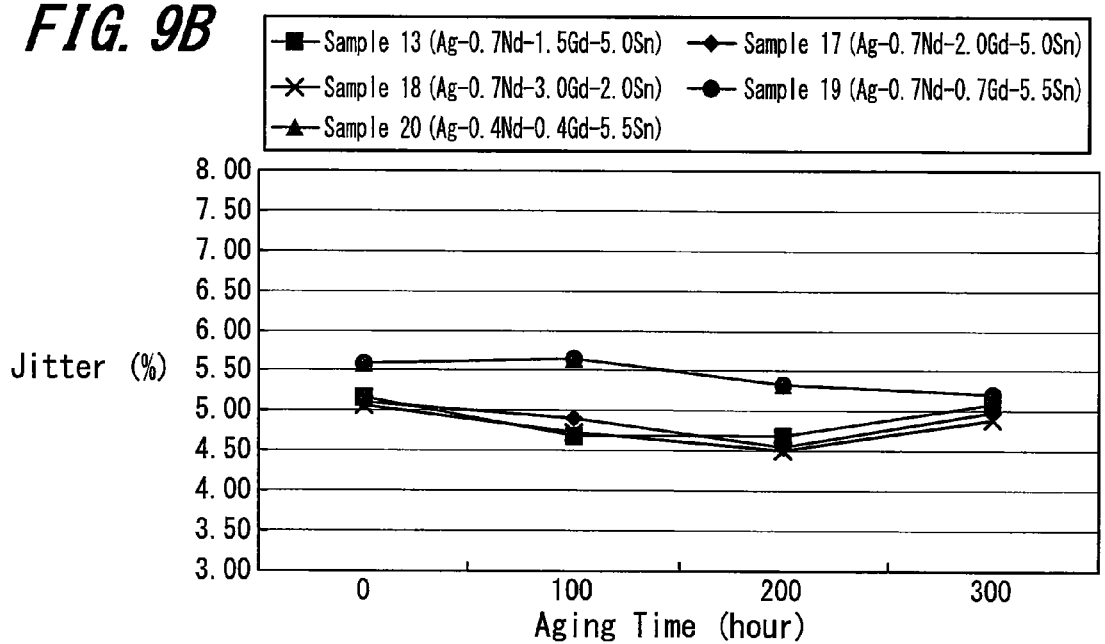
FIG. 9C
| Composition | BCA Sensitivity (power (W)@Err=0) |
|---|---|
| ■ Sample 13 (Ag-0.7Nd-1.5Gd-5.0Sn) | <1.8 |
| ◆ Sample 17 (Ag-0.7Nd-2.0Gd-5.0Sn) | <1.8 |
| ✕ Sample 18 (Ag-0.7Nd-3.0Gd-2.0Sn) | 2.6 |
| ● Sample 19 (Ag-0.7Nd-0.7Gd-5.5Sn) | 2.0 |
| ▲ Sample 20 (Ag-0.4Nd-0.4Gd-5.5Sn) | 2.2 |

Sample 20 (Ag-0.4Nd-0.4Gd-5.5Sn)

Sample 19 (Ag-0.7Nd-0.7Gd-5.5Sn)

Sample 11 (Ag-0.7Nd-1.1Gd-5.5Sn)

Sample 17 (Ag-0.7Nd-2.0Gd-5.0Sn)

OPTICAL INFORMATION RECORDING MEDIUM AND METHOD OF MARKING BCA (BURST CUTTING AREA) INTO THE SAME

CROSS REFERENCES TO RELATED APPLICATIONS

The present invention contains subject matter related to Japanese Patent Application JP 2006-136900 filed in the Japanese Patent Office on May 16, 2006, and Japanese Patent Application JP 2006-270996 filed in the Japanese Patent Office on Oct. 2, 2006, the entire contents of which being incorporated herein by reference.

FIELD OF THE INVENTION

The present invention relates to an optical information recording medium, and particularly to an optical information recording medium including a BCA (Burst Cutting Area) portion formed by laser marking and a method of marking the BCA (Burst Cutting Area).

DESCRIPTION OF THE RELATED ART

Optical information recording media such as a read-only recording medium, that is, a ROM (Read-Only Memory) CD (Compact Disc), DVD (Digital Versatile Disc), BD (Blu-ray Disc®) and HD-DVD (High Definition DVD) have typical information recording portions such as contents areas in which music information, video information and other data information are recorded and lead-in areas thereof. Further, an optical information recording medium has or may be requested to have at its central portion a BCA (Burst Cutting Area) portion in which a serial number, for example, of each disc, is recorded in order to protect a copyright, for example, to prevent the disc from being illegally copied and to ensure traceability of products distributed.

A BCA signal is recorded on the BCA portion of the optical information recording medium by irradiating and marking with laser light a reflective film simultaneously formed when forming the reflective film on the typical information recording portion of the above-mentioned optical information recording medium, and forming stripes in the shape of bar codes.

Since the BCA signal is recorded on the reflective film irradiated with laser light when the reflective film is fused, fluidized or condensed with irradiation of laser light. Accordingly, recording characteristics thereof can be evaluated based on whether or not the reflective film can be fused in a short time at low power from standpoints of improving productivity and saving labor. When it is intended to improve recording characteristics, the reflective film is requested to have low thermal conductivity and low fusing temperature characteristics.

Also, the reproducing characteristics of the BCA signals may be requested to have high reflectivity capable of obtaining a high reproduced output and to have small jitter in the reproduced signal, similarly to signals reproduced from the typical information recording portion of the optical information recording medium including the above-mentioned contents area and the lead-in area.

Al alloys mainly formed of an inexpensive JIS6061 (Al—Mg-based alloy) have been used as the reflective film in the typical read-only optical disc. However, the JIS6061-based alloy is not a material intended to be marked with laser, causing problems accordingly.

For example, there are such problems that the alloys have high thermal conductivity and may need large laser power for marking so that a substrate of the optical information recording medium may be damaged, and the alloys have insufficient corrosion resistance so that the reflective film tends to be corroded from marked cavities produced after laser marking.

On the other hand, a reflective film with high reflectivity is formed of Ag alloy in a recordable optical disc. However, there are such problems that the reflective film has insufficient heat resistance so that unnecessary aggregation occurs at high temperature to lower reflectivity.

Japanese Unexamined Patent Application Publication No. 2002-15464 discloses an optical information recording medium in which grain growth of Ag, that is, aggregation thereof can be controlled using Ag containing rare-earth elements.

Japanese Unexamined Patent Application Publication No. 2004-139712 also discloses an optical information recording medium in which reflectivity and durability can be improved using Ag containing Bi and Sb.

Japanese Unexamined Patent Application Publication No. H4-25440 and Japanese Unexamined Patent Application Publication No. H4-25032 disclose optical information recording media in which thermal conductivity of Ag alloy can be lowered by adding various kinds of elements to the Ag alloy.

SUMMARY OF THE INVENTION

However, since those reflective films are not intended to be fused and removed with irradiation of laser light, residues are left in the BCA portion marked with laser light, preventing the BCA portion from satisfying characteristics of the recording reflective film.

It is desirable to provide an optical information recording medium such as a BD (Blu-ray Disc®) including a BCA (Burst Cutting Area) portion formed by laser marking and a method of marking the BCA (Burst Cutting Area), in which reproducing characteristics of the typical information recording portion such as the above-mentioned contents area and a lead-in area and those of the BCA portion in a read-only information recording portion of a ROM (Read-Only Memory) disc are highly reliable, and also recording characteristics of the BCA portion are reliable. Further, it is desirable to provide a method of marking the BCA.

According to an embodiment of the present invention, there is provided an optical information recording medium including a read-only information recording portion and a BCA (Burst Cutting Area) portion formed by laser marking. In the optical information recording medium, a reflective film on an information recording surface of the read-only information recording portion and a reflective film on the BCA portion are formed of the same material. The composition of the reflective film includes Ag as a main component, and includes at least one of Nd and Gd, and at least one of Sn and In. The composition of the reflective film includes at least one of Nd and Gd of 0.1 atom % or more and 3.0 atom % or less in total and includes at least one of Sn and In of 3 atom % or more and 12 atom % or less in total. In the optical information recording medium, recorded information is reproduced from the information recording surface of the read-only information recording portion and a BCA signal is reproduced from the BCA portion, using blue-violet laser reproducing light.

According to another embodiment of the present invention, there is provided an optical information recording medium including a read-only information recording portion and a BCA (Burst Cutting Area) portion formed by laser marking.

In the optical information recording medium, a reflective film on an information recording surface of the read-only information recording portion and a reflective film on the BCA portion are formed of the same material. The composition of the reflective film includes Ag as a main component, and includes at least one of Nd and Gd, at least one of Sn and In, and Cu. The composition of the reflective film includes at least one of Nd and Gd of 0.1 atom % or more and 3.0 atom % or less in total, at least one of Sn and In of 3 atom % or more and 12 atom % or less in total, and Cu of 1.3 atom % or more and 13 atom % or less. In the optical information recording medium, recorded information is reproduced from the information recording surface of the read-only information recording portion and a BCA signal is reproduced from the BCA portion, using blue-violet laser reproducing light.

Further, in the optical information recording medium according to an embodiment of the present invention, the read-only information recording portion includes a multilayer information recording surface, each layer having a reflective film. The reflective film on the information recording surface located at the deepest position from a reproducing-light incident surface of the optical information recording medium is formed of the same material as that of the reflective film on the BCA portion, and the reflective films on the other information recording surfaces are semi-transparent. The composition of the reflective film includes Ag as a main component and includes at least one of Nd and Gd, and at least one of Sn and In. The composition of the reflective film includes at least one of Nd and Gd of 0.1 atom % or more and 3.0 atom % or less in total, and at least one of Sn and In of 3 atom % or more and 12 atom % or less in total.

Further, in the optical information recording medium according to an embodiment of the present invention, the read-only information recording portion includes a multilayer information recording surface, each layer having a reflective film. The reflective film on the information recording surface located at the deepest position from a reproducing-light incident surface of the optical information recording medium is formed of the same material as that of the reflective film on the BCA portion, the reflective films on the other information recording surfaces are semi-transparent. The composition of the reflective film includes Ag as a main component and includes at least one of Nd and Gd, at least one of Sn and In, and Cu. The composition of the reflective film includes at least one of Nd and Gd of 0.1 atom % or more and 3.0 atom % or less in total, at least one of Sn and In of 3 atom % or more and 12 atom % or less in total, and Cu of 1.3 atom % or more and 13 atom % or less.

Further, according to a further embodiment of the present invention, there is provided an optical information recording medium having an information recording portion including a single-layer or multilayer information recording surface having a reflective film, information being recorded on the information recording surface at least once, and a BCA (Burst Cutting Area) portion formed by laser marking. In the optical information recording medium, the reflective film on the single-layer information recording surface or the reflective film on the multilayer information recording surface located at the deepest position from a reproducing-light incident surface of the optical information recording medium is formed of the same material as that of the reflective film on the BCA portion. The composition of the reflective film includes Ag as a main component and includes at least one of Nd and Gd, and at least one of Sn and In. The composition of the reflective film includes at least one of Nd and Gd of 0.1 atom % or more and 3.0 atom % or less in total, and at least one of Sn and In of 3 atom % or more and 12 atom % or less in total. In the optical information recording medium, recorded information is reproduced from the information recording surface and a BCA signal is reproduced from the BCA portion, using blue-violet laser reproducing light.

Further, according to a yet further embodiment of the present invention, there is provided an optical information recording medium having an information recording portion including a single-layer or multilayer information recording surface with a reflective film, information being recorded on the information recording surface at least once, and a BCA (Burst Cutting Area) portion formed by laser marking. In the optical information recording medium, the reflective film on the single-layer information recording surface or the reflective film on the multilayer information recording surface located at the deepest position from a reproducing-light incident surface of the optical information recording medium is formed of the same material as that of the reflective film on the BCA portion. The reflective film includes Ag as a main component and includes at least one of Nd and Gd, at least one of Sn and In, and Cu. The composition of the reflective film includes at least one of Nd and Gd of 0.1 atom % or more and 3.0 atom % or less in total, at least one of Sn and In of 3 atom % or more and 12 atom % or less in total, and Cu of 1.3 atom % or more and 13 atom % or less. In the optical information recording medium, recorded information is reproduced from the information recording surface and a BCA signal is reproduced from the BCA portion, using blue-violet laser reproducing light.

Further, according to a still further embodiment of the present invention, there is provided a method of marking a BCA (Burst Cutting Area) with laser light into an optical information recording medium including a read-only information recording portion, and a BCA (Burst Cutting Area) portion formed by laser marking. In the optical information recording medium, a reflective film on at least one information recording surface of the read-only information recording portion and a reflective film on the BCA portion are formed of the same material. The composition of the reflective film includes Ag as a main component, and includes at least one of Nd and Gd, and at least one of Sn and In. The composition of the reflective film includes at least one of Nd and Gd of 0.1 atom % or more and 3.0 atom % or less in total, and at least one of Sn and In of 3 atom % or more and 12 atom % or less in total. The method includes the step of irradiating the BCA portion with laser light for marking the BCA from the surface opposite to the surface on which blue-violet laser light is incident to reproduce information from the read-only information recording portion and the BCA portion of the optical information recording medium.

Further, according to a still further embodiment of the present invention, there is provided a method of marking a BCA (Burst Cutting Area) with laser light into an optical information recording medium including a read-only information recording portion, and a BCA (Burst Cutting Area) portion formed by laser marking. In the optical information recording medium, a reflective film on at least one information recording surface of the read-only information recording portion and a reflective film on the BCA portion are formed of the same material. The composition of the reflective film includes Ag as a main component, and includes at least one of Nd and Gd, at least one of Sn and In, and Cu. The composition of the reflective film includes at least one of Nd and Gd of 0.1 atom % or more and 3.0 atom % or less in total, at least one of Sn and In of 3 atom % or more and 12 atom % or less in total, and Cu of 1.3 atom % or more and 13 atom % or less. The method includes the step of irradiating the BCA portion with laser light for marking the BCA from the surface opposite to the surface on which blue-violet laser light is incident to reproduce information from the read-only information recording portion and the BCA portion of the optical information recording medium.

In the above-mentioned optical information recording medium according to an embodiment of the present invention, the reflective film forming the read-only information recording portion and the BCA portion includes Ag as a main component and includes at least one of Nd and Gd and at least one of Sn and In, at least one of Nd and Gd of 0.1 atom % or more and 3.0 atom % or less in total and at least one of Sn and In of 3 atom % or more and 12 atom % or less in total. Therefore, although the reflective film includes Ag as the main component, the recording characteristics of the BCA signal when marking the reflective film with laser, and the reproducing characteristics of the BCA portion and the typical information recording portion of the optical information recording medium, for example, the read-only information recording portion could be improved.

Further, in the above-mentioned optical information recording medium according to an embodiment of the present invention, the reflective film forming the read-only information recording portion and the BCA portion includes Ag as a main component and includes at least one of Nd and Gd, at least one of Sn and In, and Cu, at least one of Nd and Gd of 0.1 atom % or more and 3.0 atom % or less in total, at least one of Sn and In of 3 atom % or more and 12 atom % or less in total, and Cu of 1.3 atom % or more and 13 atom % or less. Therefore, although the reflective film includes Ag as the main component, the recording characteristics of the BCA signal when marking the reflective film with laser, and the reproducing characteristics of the BCA portion and the typical information recording portion of the optical information recording medium, for example, the read-only information recording portion could be improved. In addition, storage environment is improved to have further reliability in the optical information recording medium.

With the optical information recording medium according to an embodiment of the present invention regardless of containing or not containing Cu, specifically, regarding the recording characteristics of the BCA signal, the recording power to mark the reflective film with laser could be reduced. With the recording power being reduced, the recording speed can be increased and the manufacturing cost of the optical information recording medium could be reduced. Also, it becomes possible to record and reproduce signals in the BCA portion based on the prescribed format.

Also, with respect to the reproducing characteristics, while the maximum value of the reflectivity of an 8T signal (hereinafter referred to as a "$R_{8H}$") in a 17pp modulation signal is defined as the reflectivity in the BD (Blu-ray Disc®), for example, reflectivity sufficiently over the lower limit value of 35% according to the standard could be obtained. Also, in the 17pp modulation signal, the jitter value could be reduced to a value sufficiently lower than the upper limit value of 6.5% according to the standard.

The reproduced signal is proved to have sufficient weather resistance and reliability. In particular, upon containing Cu, the occurrence of Ag single crystal grain (Ag hillocks), the size of which ranges from several μm to 10-and-several μm, could be controlled in the storage environment reliability test.

In the past, in order to improve marking sensitivity in laser heating, other elements were added to Ag alloy reflective films so that laser marking can be carried out. However, there are still problems in the related-art in which reflectivity and long-term storage stability are deteriorated although sensitivity is improved.

Further, in the laser marking, a portion of the reflective film is removed by fusing and fluidizing it with irradiation of laser light and the portion is used as a recording mark. It is frequently observed that a large residue of the reflective film is left in the recording mark. In this regard, if laser light reproducing the BCA signal passes through the residue inside the recording mark, such reproducing laser light may be detected as an unnecessary signal and quality of the BCA signal is lowered accordingly.

On the other hand, in the optical information recording medium according to an embodiment of the present invention, only a small residue that may not influence the signal is left inside the recording mark after the marking, and therefore a BCA signal with high quality could be obtained.

According to the embodiments, Nd and Gd are used mainly for long-term storage stability and for controlling pitting corrosion. Further, Gd is added by a small amount to efficiently absorb marking light, and Sn and In lower a melting-point.

Further, the above-described four elements are added to lower thermal conductivity.

The lower limits of these contents are necessary conditions to obtain the above-mentioned excellent laser marking characteristics and to perform laser marking of short time period with low power.

Also, the upper limits of these contents are important to obtain the above-mentioned excellent reproducing characteristics and long-term storage stability.

In addition, Cu may act to control Ag hillocks being generated. The lower limit value of the Cu content is a necessary condition for efficiently controlling Ag hillocks being generated and the upper limit of the Cu content is a necessary condition for maintaining sufficient reflectivity.

Furthermore, according to an embodiment of a method of marking a BCA (Burst Cutting Area) with laser, information is recorded on the optical information recording medium from the side opposite to the side where blue-violet laser reproducing light is incident on the typical information recording portion such as the contents area and the lead-in area. Accordingly, recording sensitivity of the laser marking, that is, the BCA signal can be made constant and the recording power for the BCA signal can be made constant, regardless of the information recording layer being formed of a single layer or a multilayer.

BRIEF DESCRIPTION OF THE DRAWINGS

FIGS. 4A and 4B are waveform diagrams, in which FIG. 4A is a diagram showing a waveform of current detected by a detector that detects reflected light of the reproducing light from the BCA code, and FIG. 4B is a diagram showing a waveform of a signal output from a LPF (low-pass filter) when the detected current is input to the LPF;

FIG. 6 is a table showing the results of measured characteristics obtained when composition of a reflective film of the optical information recording medium is varied;

FIGS. 7A to 7C are diagrams respectively showing measurement results, in which FIGS. 7A and 7B show the results of aging test on reflectivity $R_{8H}$ and jitter in the optical information recording media in which composition of reflective films was varied, and FIG. 7C is a table showing measurement results of BCA recording power;

FIGS. 9A to 9C are diagrams respectively showing measurement results, in which FIGS. 9A and 9B show the results of aging tests on reflectivity $R_{8H}$ and jitter in the optical information recording media in which composition of reflective films was varied, and FIG. 9C is a table showing measurement results of BCA recording power;

DESCRIPTION OF THE PREFERRED EMBODIMENTS

An optical information recording medium and a method of marking a BCA (Burst Cutting Area) into the optical information recording medium with laser light according to an embodiment of the present invention will be described below, however, it should be appreciated that embodiments may not be limited thereto.

Figure 1:
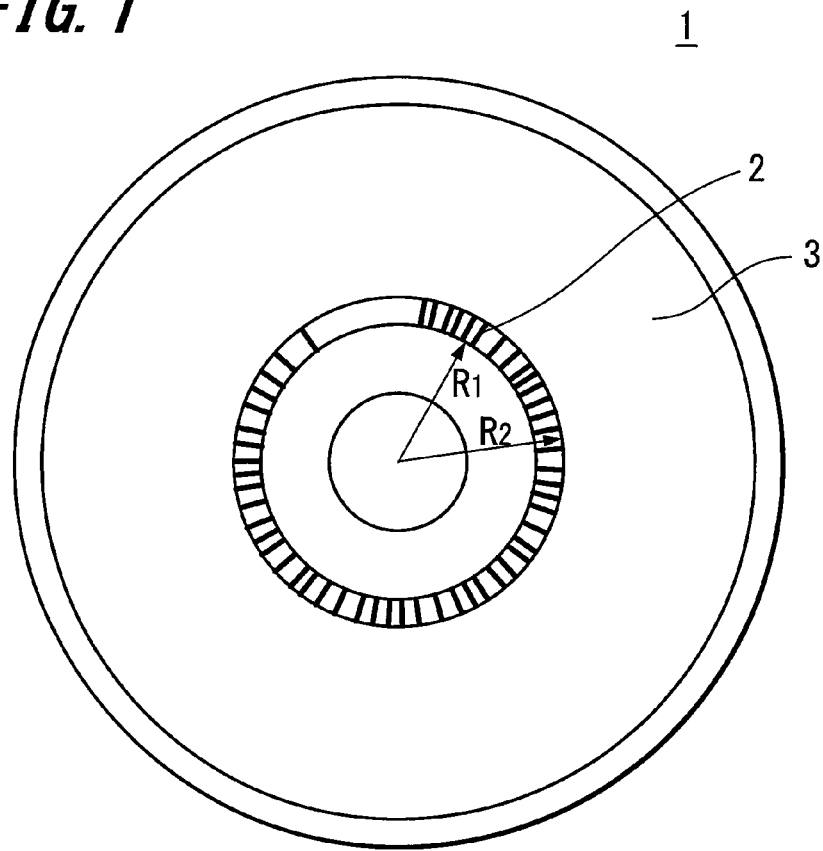
FIG. 1 is a plan view showing an example of an optical information recording medium according to an embodiment of the present invention.
Figure 2:
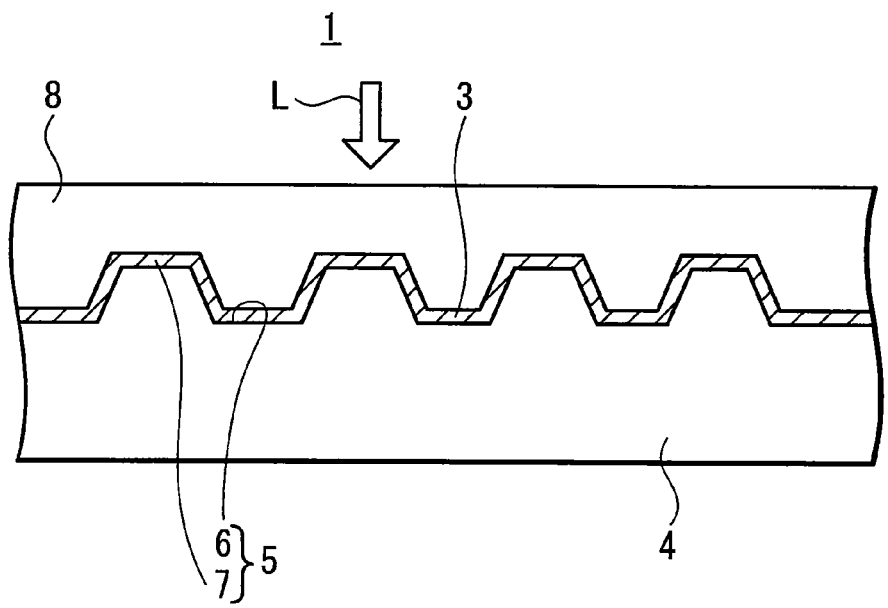
FIG. 2 is a schematic cross-sectional view partly showing an example of the optical information recording medium according to an embodiment of the present invention along the circumference direction.

FIG. 1 is a plan view showing an example of an optical information recording medium 1 according to an embodiment of the present invention, and FIG. 2 is a schematic cross-sectional view partly showing the optical information recording medium 1 along the circumference direction.

As illustrated, the optical information recording medium 1 is a recording medium from which data may be reproduced with blue-violet reproducing light having a wavelength of around 405 nm. For example, the optical information recording medium 1 is a read-only (ROM) BD (Blu-ray Disc®). The optical information recording medium 1 has a BCA (Burst Cutting Area) portion 2 formed at its center portion, that is, around the center hole, and has a read-only information recording portion 3 that represents the typical information recording portion of the recording medium such as a contents area and a lead-in area formed around the BCA portion 2.

As shown in FIG. 2, the optical information recording medium 1 includes a substrate 4 in disk shape formed of polycarbonate having the thickness of 1.1 mm and the diameter of 12 cm, for example, and an information recording surface 5 forming the above-mentioned read-only information recording portion 3 is formed on one major surface of the substrate 4. The information recording surface 5 has an uneven surface 6 formed of pit trains based on various kinds of recording information, and a reflective film 7 is formed on the surface of the uneven surface 6.

The optical information recording medium 1 has a light transmissive layer 8 formed on its surface opposite to the substrate 4 by either bonding a light transmissive sheet or by coating the surface with a light transmissive resin. The optical information recording medium 1 is irradiated with reproducing light L that is blue-violet laser light having a wavelength of around 405 nm from the side of the light transmissive layer 8, thereby reading, that is, reproducing recorded information from the information recording surface 5.

The BCA portion 2 is formed in an annular zone, inside diameter R1 of which is 21.3 mm (+0.00/−0.3 mm permissible) and outside diameter R2 of which is 22.0 mm (+0.2/0.00 mm permissible) in the disc having a diameter of 12 cm.

The multilayer reflective film 7 of the optical information recording medium 1 according to an embodiment of the present invention includes Ag as a main component and includes at least one of Nd and Gd and at least one of Sn and In.

Here, at least one of Nd and Gd of 0.1 atom % or more and 3.0 atom % or less is included, and preferably both of Nd and Gd of 1.0 atom % or less are included in total.

Further, at least one of Sn and In of 3 atom % or more and 12 atom % or less is included in total in the reflective film. Also, in the case of Cu being contained in the reflective film, Cu of 1.3 atom % or more and 13 atom % or less is included.

Subsequently, the above-mentioned annular zone of the reflective film 7 is irradiated with high-power recording laser light having a wavelength of 810 nm, for example, to mark the zone with a BCA signal, thereby forming the BCA portion 2.

Figure 3:
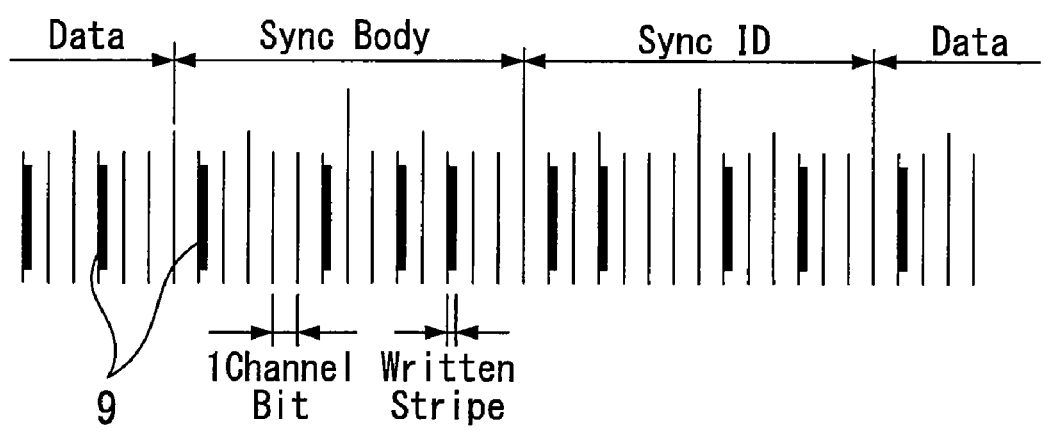
FIG. 3 is a schematic pattern diagram of an example of a BCA code.

FIG. 3 is a schematic pattern diagram of a BCA code of the BCA portion.

Pits of 2T to 8T (not shown) simultaneously formed with information pits being formed on the uneven surface 6 of the above-mentioned information recording surface 5 are arrayed on the BCA portion 2, and the aforementioned reflective film 7 is formed thereon entirely.

Here, in a method of marking a BCA (Burst Cutting Area) according to an embodiment of the present invention, the BCA signal is marked, that is, the BCA signal is recorded into the reflective film 7 in the BCA zone where the pits are formed, by forming stripes 9 in barcode shape according to the format of the optical information recording medium 1 reproduced by blue-violet laser light, in this example, a format determined by the BD (Blu-ray Disc®) standard.

When the stripes 9 are formed with laser light, the reflective film is irradiated with recording laser light having the above-mentioned wavelength of 810 nm from the side of the substrate 4 and fused, thereby the reflective film material being fluidized and aggregated to form a portion where the reflective film 7 is removed in the shape of stripes.

A spot irradiated with the laser light has the length of 40 μm and the width of 1 μm, for example, and the laser irradiated spot is formed by laser light having power density of 75 mW/μm². On the other hand, since the stripe 9 has the length of 700 μm to 1200 μm and the width of 12 μm, for example, the reflective film is irradiated with recording laser light repeatedly while shifting the position irradiated with the laser light in the length and width directions.

Then, information recorded in the BCA signal portion 2 is reproduced similarly to reproducing data from the information recording surface 5, in which the optical information recording medium is irradiated with blue-violet laser light having a wavelength of approximately 405 nm from the same side, that is, the side of the light transmissive layer 8.

Figures 4A, 4B:
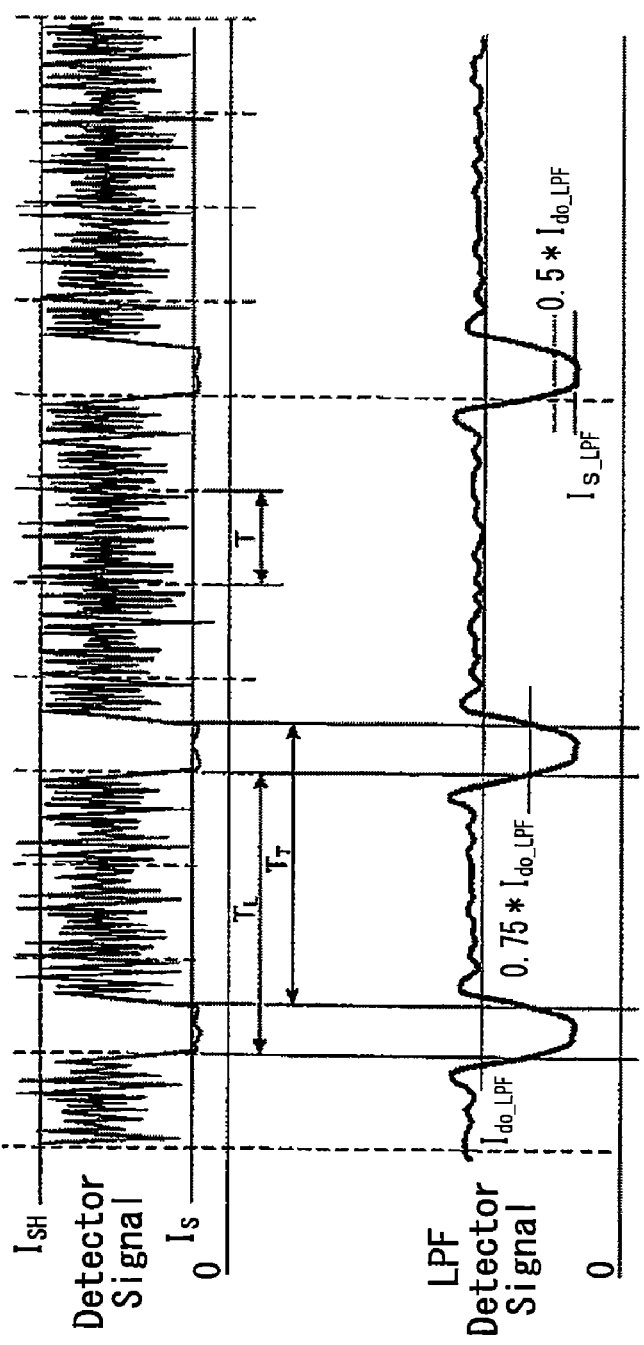

FIG. 4A is a diagram showing a waveform of output current detected by a detector that detects light reflected from the BCA code with irradiation of the above-mentioned reproducing light. In the case of reproducing the BCA signal, focusing control is performed on the reproducing laser light but tracking control may not be performed. Since the reproducing laser light is hardly reflected in the region where the reflective film 7 is removed to form the stripes 9 with the BCA signal, an extremely small output current Is may be detected. On the other hand, a 17pp modulation signal is recorded in the area without the stripes 9 and a highest detected output current represents $I_{8H}$ obtained from an 8T signal.

A high frequency component of the detected output current is cut by a low-pass filter (LPF), not shown, cut-off frequency of which is 500 kHz. FIG. 4B is a diagram showing a waveform of a signal output from a LPF (low-pass filter), and a BCA signal in the form of a pulse may be obtained in response to the interval and width corresponding to the stripe 9.

Figure 5:
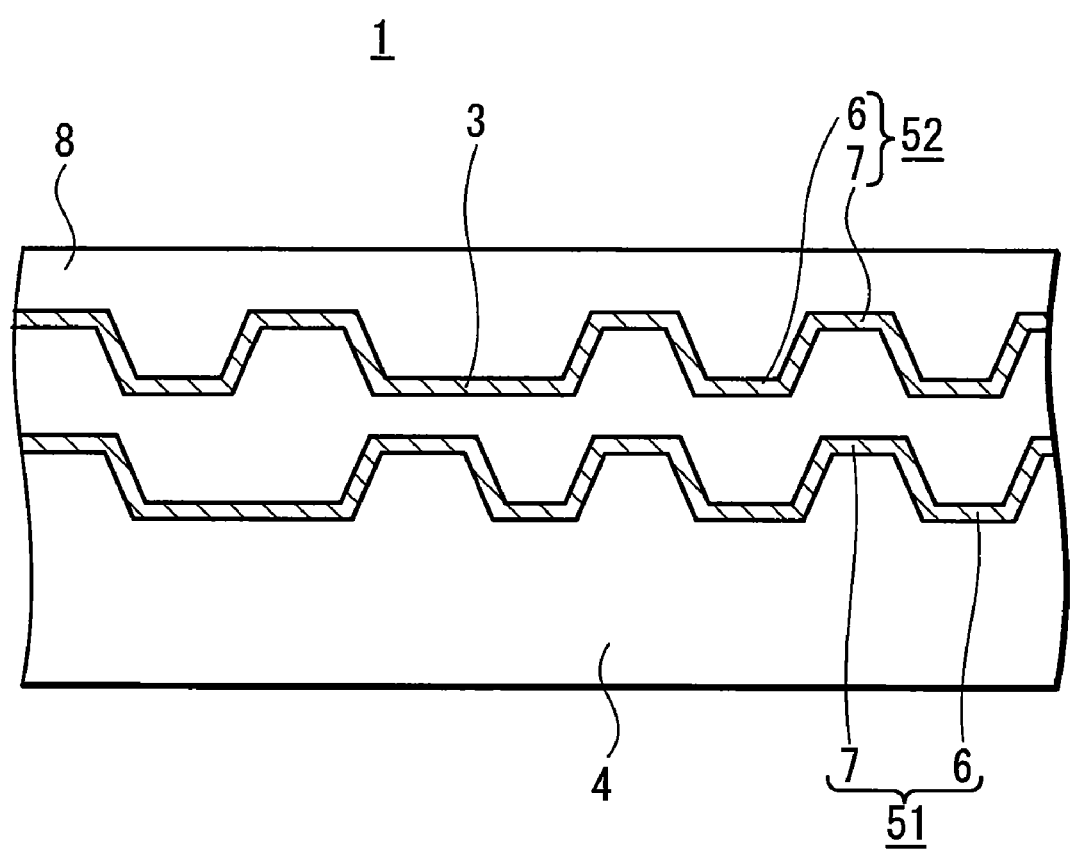
FIG. 5 is a schematic cross-sectional view partly showing an example of a multilayer optical information recording medium according to an embodiment of the present invention.

The optical information recording medium 1 according to an embodiment of the present invention shown in FIG. 2 includes the information recording surface 5 of the read-only information recording portion 3, having the single layer structure. However, an embodiment of the present invention is not limited to the single layer structure. FIG. 5 is a schematic cross-sectional view of a main portion of the optical information recording medium 1 according to another embodiment of the present invention. In the embodiment, there is illustrated the optical information recording medium 1 in which the read-only information recording portion has a multilayer structure of two layers.

In FIG. 5, elements and parts identical to those shown in FIG. 2 are denoted by the same reference numerals and therefore are not described. As shown in FIG. 5, the read-only information recording portion has the two-layer structure in this embodiment, in which the uneven surface 6 formed of pit trains of contents data such as music information and video information and various kinds of data information is formed on one major surface of the substrate 4 and in which first and second information recording surfaces 51 and 52, each of which has the reflective film 7 formed thereon, are stacked.

The first and second information recording surfaces 51 and 52 can be formed by a known method. For example, when molding the substrate 4, the uneven surface 6 on which the first information recording surface 51 is formed is also molded on one major surface of the substrate 4, and the reflective film 7 is deposited on the surface of the uneven surface 6 by sputtering using the material having the above-mentioned composition. Subsequently, the first information recording surface 51 is coated with a ultraviolet-curing resin and molded with pressure by a 2P (Photopolymerization) method, thereby forming the uneven surface 6 of the second information recording surface 52 with recording information, and further, the reflective film 7 is deposited thereon by a sputtering method or the like.

In this case also, when information is reproduced from the information recording surface and information is reproduced from the BCA signal portion 2 with blue-violet laser light having a wavelength of approximately 405 nm, the optical information recording medium is irradiated with the reproducing light L from the side of the light transmissive layer 8.

In this regard, when information is reproduced from the first and second information recording surfaces 51 and 52, respectively, reproducing light is selectively focused on the first information recording surface 51 or the second information recording surface 52.

Accordingly, it is desirable that the reflective film 7 on the information recording surface located at the deepest position from the surface on which the blue-violet laser reproducing light is incident, that is, in the embodiment shown in FIG. 5, the reflective film 7 of the information recording surface 51 should be formed of a total reflective film capable of reflecting the whole of incident laser light. The reflective film 7 of the information recording surface located at a shallow position, in the embodiment, the reflective film 7 of the second information recording surface 52 is formed of a semitransparent reflective film relative to the reproducing light L.

Such semitransparent reflective films can be selected to have the above-mentioned composition, and transmittance of those semitransparent reflective films can be selected by selecting the thickness thereof. Further, the total reflective film and the semitransparent reflective film can be selected to have different composition. In that case also, transmittance of the semitransparent reflective film can be selected by selecting the thickness thereof similarly to the above description.

In the embodiment shown in FIG. 5, the optical information recording medium has the multilayer information recording surface including the two information recording surfaces 51 and 52, however, an embodiment of the present invention is not limited to the optical information recording medium having the two layers, and the optical information recording medium may be a multilayer optical information recording medium having three layers or more. In any of the multilayer optical information recording media, the reflective film 7 of the information recording surface located farthest from incident light of the blue-violet laser reproducing light, that is, the reflective film 7 of the information recording surface located at the deepest position from the incident surface may be used for the reflective film on the BCA portion 2 in which the BCA signal is recorded.

Subsequently, the BCA signal is recorded, that is, the BCA is marked by irradiating the optical information recording medium 1 with the above-mentioned recording laser light from the side of the substrate 4.

Next, relationships between composition of the reflective film 7 and the characteristics thereof in the optical information recording medium 1 according to an embodiment of the present invention will be described with reference to experimental examples. FIG. 6 (table 1) shows samples (Sample No. 1 to 23) prepared with various kinds of composition so far examined as the reflective film 7 and evaluated results.

The experimental conditions will be described below.

With respect to reflectivity, a Blu-ray Disc® evaluation system manufactured by Pulstec Industrial Co., Ltd., under the trade name of ODU-1000 (hereinafter referred to as a BD evaluation system) was used, and an information signal was reproduced from the side of the light transmissive layer using a laser pickup having a laser wavelength of 405 nm, an objective lens of which has a numerical aperture (N. A.) of 0.85. Of the reproduced signals, a maximum value ($R_{8H}$) of a long mark (8T mark) signal in which an amount of returned light is largest was measured, and reflectivity of a disc was defined based on the signal amount with calculation using a signal amount of a disc, reflectivity of which was known in advance. It should be noted that reflectivity was measured before constant-temperature and constant-humidity test and after the test at every 100 hours. With respect to the conditions of the constant-temperature and constant-humidity test, a temperature was 80° C., a relative humidity was 85% and samples were taken out from a constant-temperature and constant-humidity bath at every 100 hours of holding time, and reflectivity was measured.

An information signal reproduced using the Blu-ray Disc® evaluation system was waveform-equalized using a limit equalizer and was converted into binarized data of "0" and "1" at a binarizing circuit. A jitter value was measured by a time interval analyzer using a clock and binarized data synchronized at a PLL (Phase-Locked Loop) circuit. Jitter values were measured before the constant-temperature and constant-humidity test and after the test at every 100 hours similar to measuring reflectivity.

A BCA (Burst Cutting Area) was recorded using BCA recording laser having a wavelength of 810 nm, the spot shape of which has the length of 40 μm and the width of 1 μm, conforming to the ROM standard of a BD (Blu-ray Disc®). Specifically, a BCA recording laser spot was shifted by 35 μm per rotation of an Ag alloy optical disc from the inner periphery to the outer periphery, the Ag alloy optical disc was irradiated with the laser light with laser spots being overlapped by 5 μm, and rectangular marks having the length of approximately 800 μm in the radius direction and having the width of approximately 11.6 μm were radially formed in the area from 21.2 mm to 22.0 mm in the radial direction. While a linear velocity upon recording was 3 m/sec and laser power was being varied, BCA marks were recorded and the signals thereof were evaluated.

Next, experimental results will be described.

First, in the optical information recording medium 1 shown in FIG. 2, the reflective film 7 was formed to have a composition of Ag-0.7Nd-αSn, where α was varied (samples 2, 3, 6 and 8).

FIGS. 7A and 7B are graphs showing measured results obtained when reflectivity $R_{8H}$ and jitter values of the optical information recording media were measured at 80° C. with humidity of 85% in the aging test.

FIG. 7C is a table showing recording powers obtained when there is no errors in reading the BCA signals in the respective samples shown in FIGS. 7A and 7B, that is, showing BCA recording powers.

According to the measured results shown in FIGS. 7A and 7B, it is understood that high reflectivity can be obtained and change over time can be reduced if Sn content is small. However, FIG. 7C shows that sensitivity is lowered if Sn content is reduced.

Figure 8A:
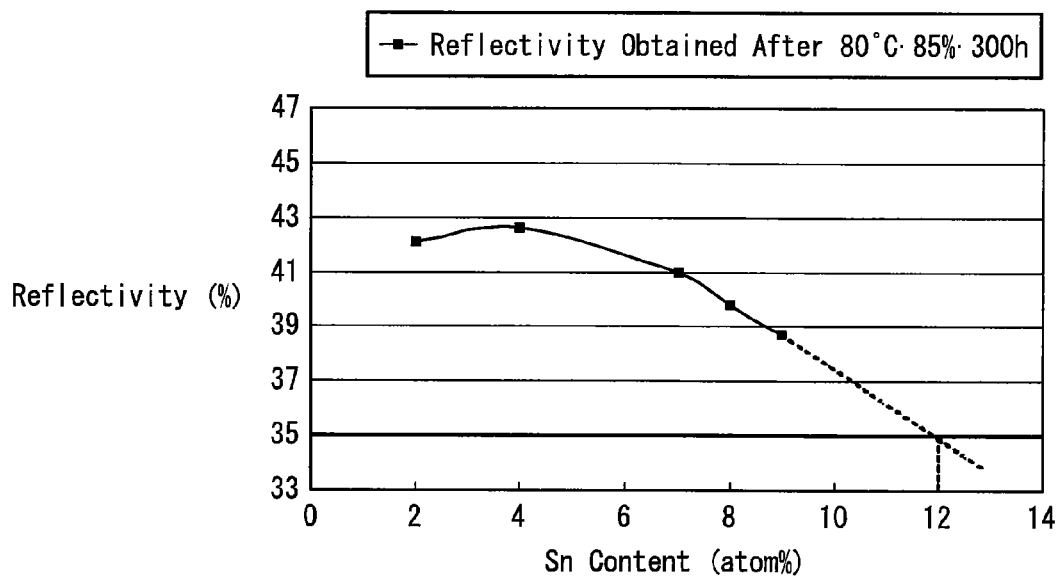
FIGS. 8A and 8B are diagrams respectively showing reflectivity (%) and recording power (W) obtained at the aging tests after 300 hours (H) relative to Sn content (atom %) based on the results shown in FIGS. 7A and 7C.
Figure 8B:
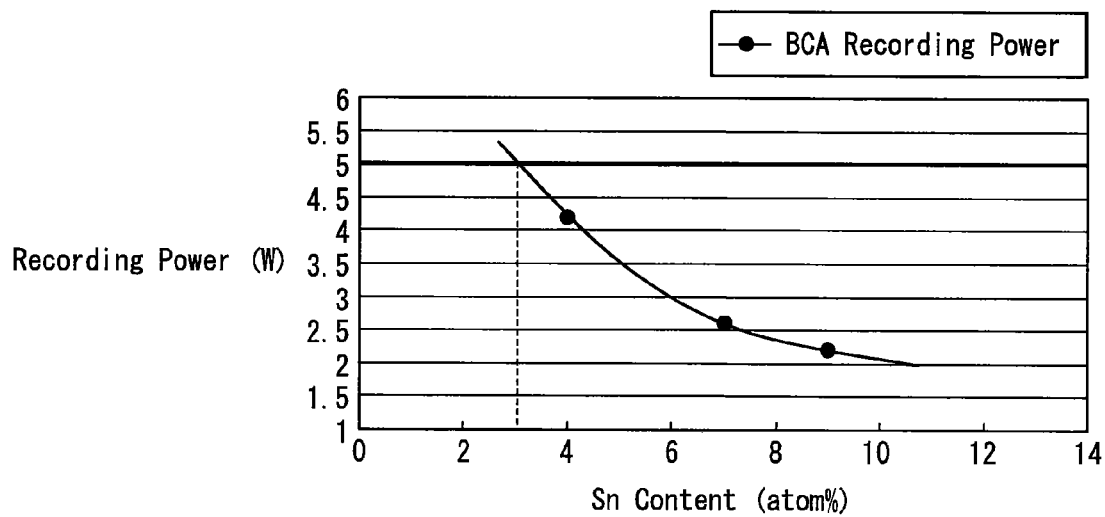

FIGS. 8A and 8B are diagrams showing reflectivity (%) and recording power (W) relative to Sn contents (atom %), obtained at the aging test after 300 hours (H) based on the results shown in FIGS. 7A and 7B.

According to Blu-ray Disc® standards, it is desirable that reflectivity should be 35% or more after the aging test, and it is to be understood from FIG. 8A that Sn content should be 12 atom % or less.

Also, it is desirable that laser output with a wavelength of 810 nm used in BCA recording should be selected to be approximately 5 W or less for commercial use, and accordingly, it is to be understood from FIG. 8B that Sn content should be selected to be 3 atom % or more.

Further, with respect to In, since In is similar to Sn in chemical properties, similar results to those of Sn can be obtained. Therefore, Sn can be replaced with In, or a total content of both Sn and In can be selected to be 3 atom % or more and 12 atom % or less.

Also, similarly, in the optical information recording medium 1 shown in FIG. 2, the reflective film 7 was formed so as to have composition of Ag-γNd-βGd-αSn containing Gd, the composition of Sn was selected to be approximately 5.0 atom %, the composition of Nd was selected to be approximately 0.7 atom % and Gd content was varied mainly (samples 13, 17, 18, 19 and 20).

FIGS. 9A and 9B are graphs showing measured results obtained when reflectivity $R_{8H}$ and jitter values of these optical information recording media (samples 13, 17, 18, 19 and 20) were measured at 80° C. with a humidity of 85% in the aging test.

Also, FIG. 9C is a table showing recording powers obtained when there is no errors in reading the BCA signals in those samples 13, 17, 18, 19 and 20, that is, showing BCA recording powers.

Figure 10A:
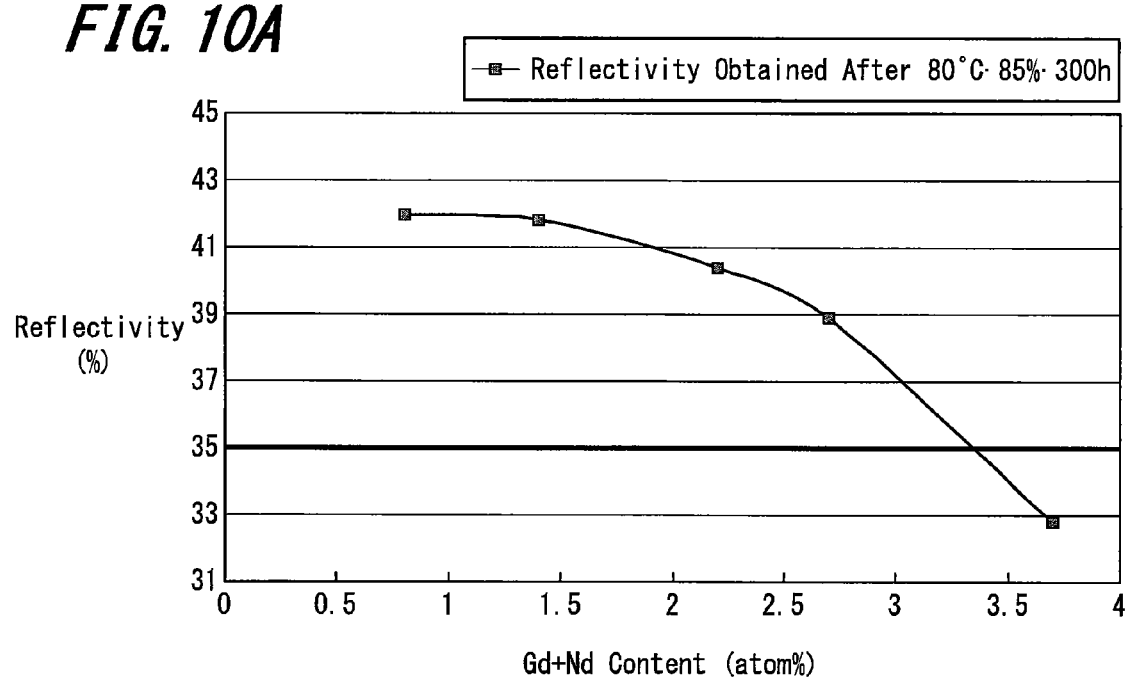
FIGS. 10A and 10B are diagrams respectively showing reflectivity and BCA recording power obtained at the aging tests after 300 hours on a total value of Nd and Gd contents based on the results shown in FIGS. 9A and 9B.
Figure 10B:
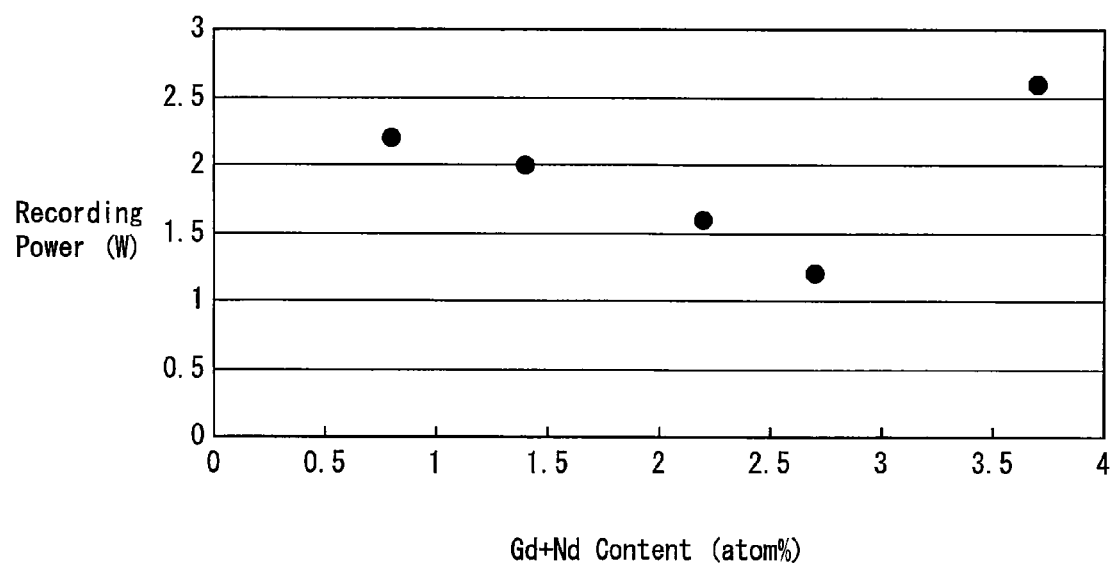
Figure 11A:
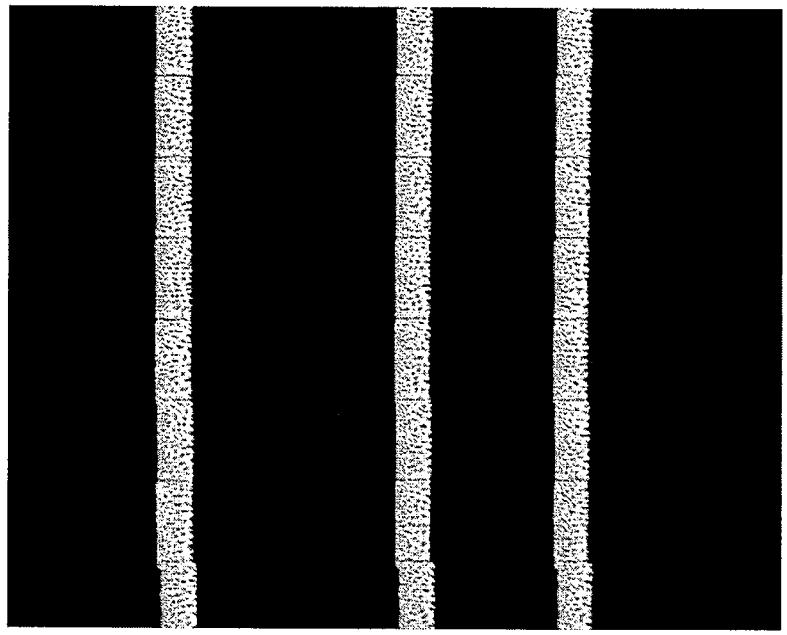
FIGS. 11A and 11B are microscopic representations of BCA recording portions of the optical information recording media according to an embodiment of the present invention, respectively.
Figure 11B:
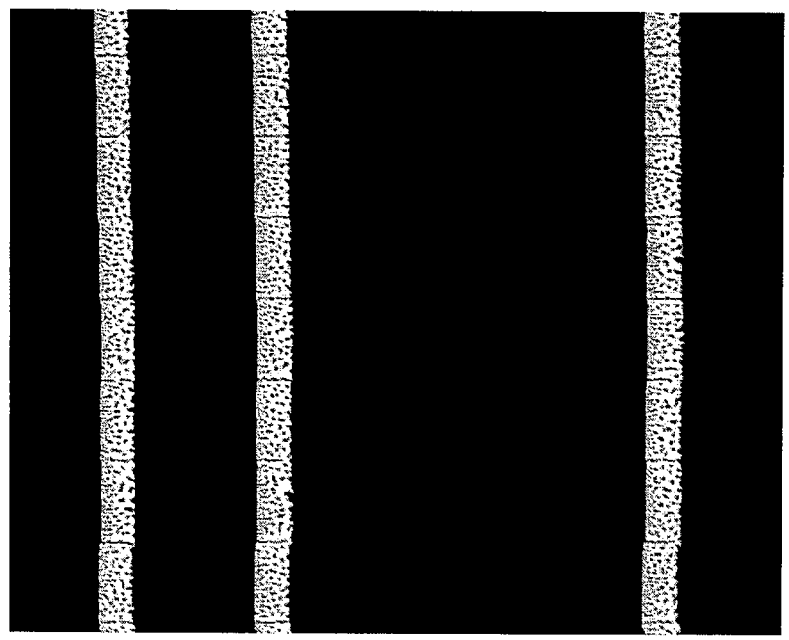
Figure 12A:
FIGS. 12A and 12B are microscopic representations of BCA recording portions of the optical information recording media according to an embodiment of the present invention, respectively.
Figure 12B:
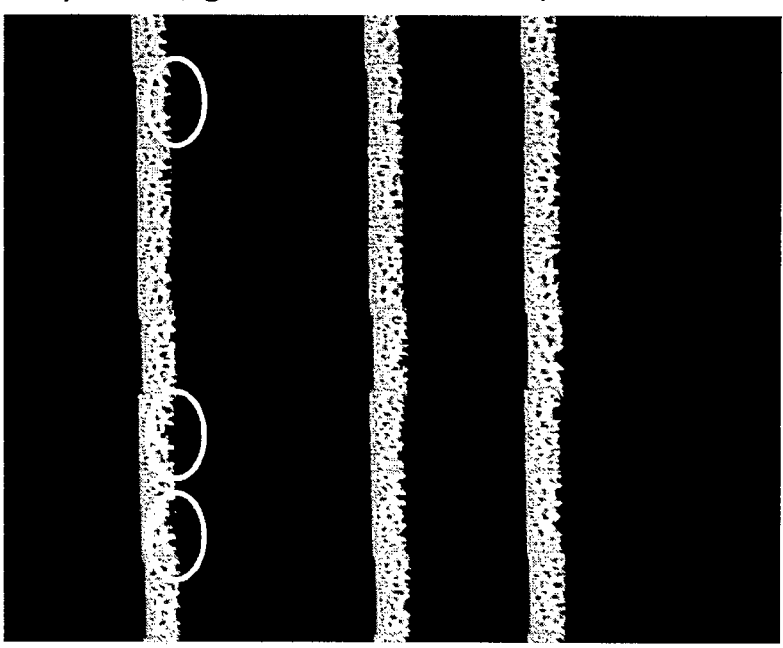

FIG. 10A is a diagram showing measured results obtained when a total value of Nd and Gd content was plotted on the horizontal axis and reflectivity at the aging test after 300 hours was plotted on the vertical axis based on the measured results from FIGS. 9A and 9B, and FIG. 10B is a diagram showing measured results obtained when a total value of Nd and Gd content was plotted on the horizontal axis and BCA recording power was plotted on the vertical axis.

According to the measured results shown in FIGS. 10A and 10B, when the total value of Nd and Gd content is over 3 atom %, although Sn content is as small as 2 atom %, the reflectivity obtained after the aging test is reduced considerably. Therefore, according to FIG. 10A, it is desirable that Nd and Gd content should be 3 atom % or less in total. Also, according to FIG. 10B, even when Gd content is the smallest 0.4 atom %, the BCA recording power can be reduced to 2.2 W by adding Gd. Hence, it is understood that the Gd content of a small amount can improve recording sensitivity considerably. The reason why the recording power is increased to 2.6 W in the sample 18 is that Sn content is as small as 2.0 atom %.

FIGS. 11A, 11B and FIGS. 12A, 12B are microscopic representations showing marks of the BCA signals in an enlarged-scale, that is, showing a portion of the BCA code in the discs of samples 20, 19 and samples 11, 17. Having compared these microscopic representations shown in FIGS. 11A, 11B and FIGS. 12A, 12B, it is to be understood that the sample with the small total content of Nd and Gd has more controllability on residue. With respect to the Gd content, it is to be understood that, while the samples 11 and 17 with the content over 1 atom % have relatively large residues inside the BCA marks, the samples 20 and 19 with the content less than 1 atom % have extremely small residues, and that the BCA signals with small noise can be obtained. In the case of Nd, it is desirable that Nd content should be less than 1 atom % similarly. Accordingly, it is desired that the total value of Nd and Gd content should be within the range of 0.1 atom % to 3.0 atom %. More preferably, when both the Nd content and the Gd content are less than 1 atom %, excellent BCA signals can be obtained.

Further, the optical information recording media containing Cu (samples 22 and 23) are examined as follows. In comparison thereto, the sample 21 that corresponds to an optical information recording medium which does not contain Cu will be employed.

Figure 14A:
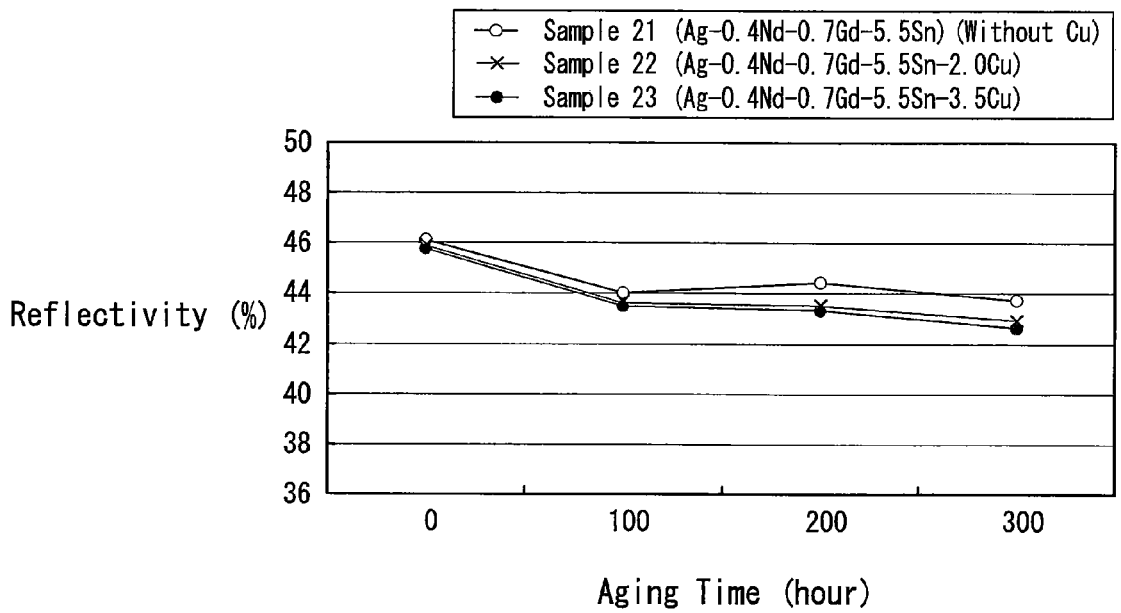
FIGS. 14A and 14B are diagrams respectively showing measurement results of aging tests on reflectivity $R_{8H}$ and jitter in the optical information recording media in which composition of reflective films was varied.
Figure 14B:
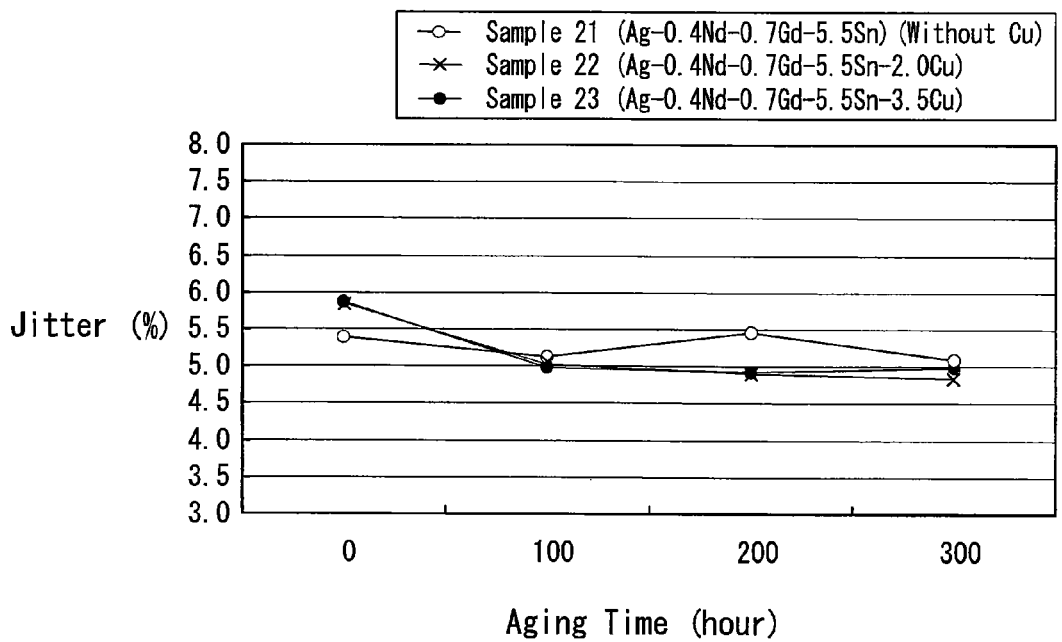

As shown in FIG. 6 (table 1), reflectivity and jitter values obtained with respect to the samples 21, 22 and 23 before and after the environmental test exhibit the changes in values which can be regarded as substantially identical. FIGS. 14A and 14B are graphs showing measured results obtained when reflectivity $R_{8H}$ and jitter values of the samples 21, 22 and 23 were measured at 80° C. with a humidity of 85% in the aging test. According to FIGS. 14A and 14B, it was confirmed that the reflectivity and the jitter values could be prevented from being deteriorated with the addition of Cu before and after the environmental test. Also with respect to the BCA recording power, as shown in FIG. 6 (table 1), the recording powers obtained from the samples 22 and 23 with the Cu content when there is no errors in reading the BCA signals were small as compared to that of the sample 21 without the Cu content, and hence recording sensitivity can be increased, that is, characteristics can be improved.

Specifically, upon adding Cu, the signal characteristics such as the reflectivity and the jitter value can be prevented from being deteriorated and BCA recording characteristics can also be prevented from being deteriorated.

Figure 15C:
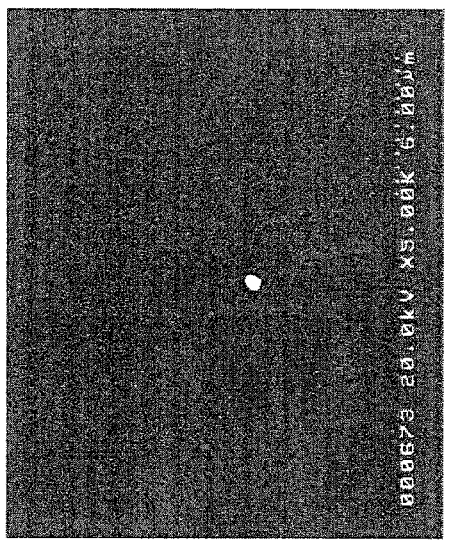
FIGS. 15A to 15D are electron microscope representations showing states in which Ag hillocks are caused in films with or without Cu, respectively.
Figure 15D:
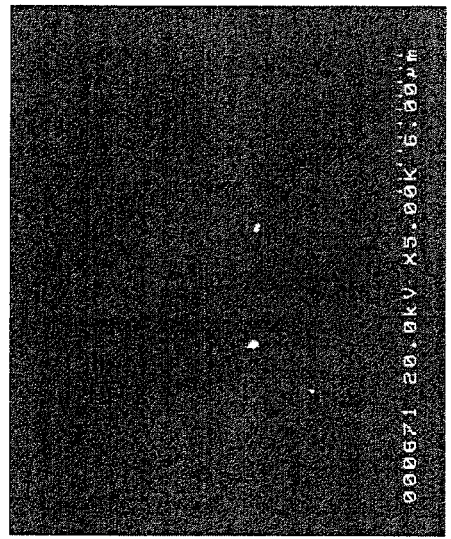
Figure 15A:
Figure 15B:
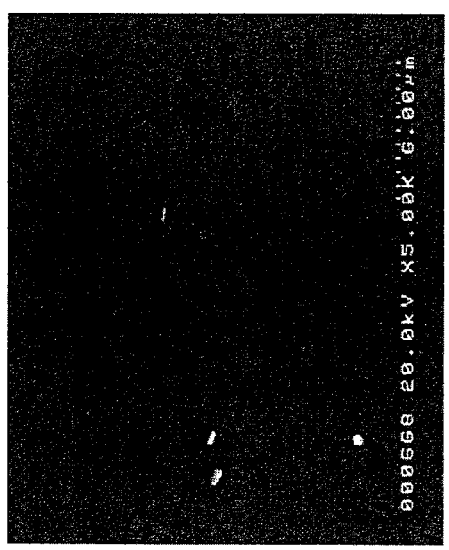

Next, the occurrence of Ag hillocks in the optical information recording media with and without Cu content was examined. FIGS. 15A, 15B and 15C are electron microscopic representations (×5000) of samples obtained at the constant-temperature and constant-humidity test (80° C. and 85%) after 100 hours, the samples having Ag-0.4Nd-0.7Gd-5.5Sn film, Ag-0.4Nd-0.7Gd-5.5Sn-1.3Cu film, Ag-0.4Nd-0.7Gd-5.5Sn-3.2Cu film and Ag-0.4Nd-0.7Gd-5.5Sn-3.8Cu film, respectively. The samples are formed with thin films having the thickness of 40 nm with the above-described material composition on the polycarbonate substrate, in which the light transmissive layer 8 shown in FIG. 2 is removed and the thin film 7 is exposed. Since Ag hillocks are triggered by external factors such as moisture and ions, it is to be understood that the samples without protective layers or the like have low weatherability as compared to the optical recording media according to the embodiment of the present invention (having the cover, that is, light transmissive layer 8).

Having examined the samples shown in FIGS. 15A, 15B and 15C, it is to be understood that a frequency at which Ag hillocks occur in the sample shown in FIG. 15B with the Cu content of 1.3 atom % can be controlled as compared to the sample without the Cu content shown in FIG. 15A. Further, the occurrence of Ag hillocks can almost be controlled in the sample with the Cu content of 3.2 atom % shown in FIG. 15C and in the sample with the Cu content of 3.8 atom % shown in FIG. 15D. From the measured results of the samples without covers shown in FIGS. 15A to 15D, it is to be understood that if at least the Cu content is 1.3 atom % or more in the structures of the optical recording media assumed in the embodiment of the present invention, occurrence of Ag hillocks can be controlled.

In addition, it has been studied by the inventors that upon adding Cu which replaces Ag, optical characteristics of the optical recording medium are not readily deteriorated. Reflectivity $R_{8H}$ of the optical recording media (structures shown in FIG. 2), in which Ag alloy thin films having the thickness of 40 nm were formed including Ag as a main component, Cu of 0 atom %, 8 atom %, 12 atom %, 7 atom % and 17.3 atom % added thereto and including Ta of 4 atom %, was measured under experimental conditions similar to the above. Measured results are shown in FIG. 16.

Figure 16:
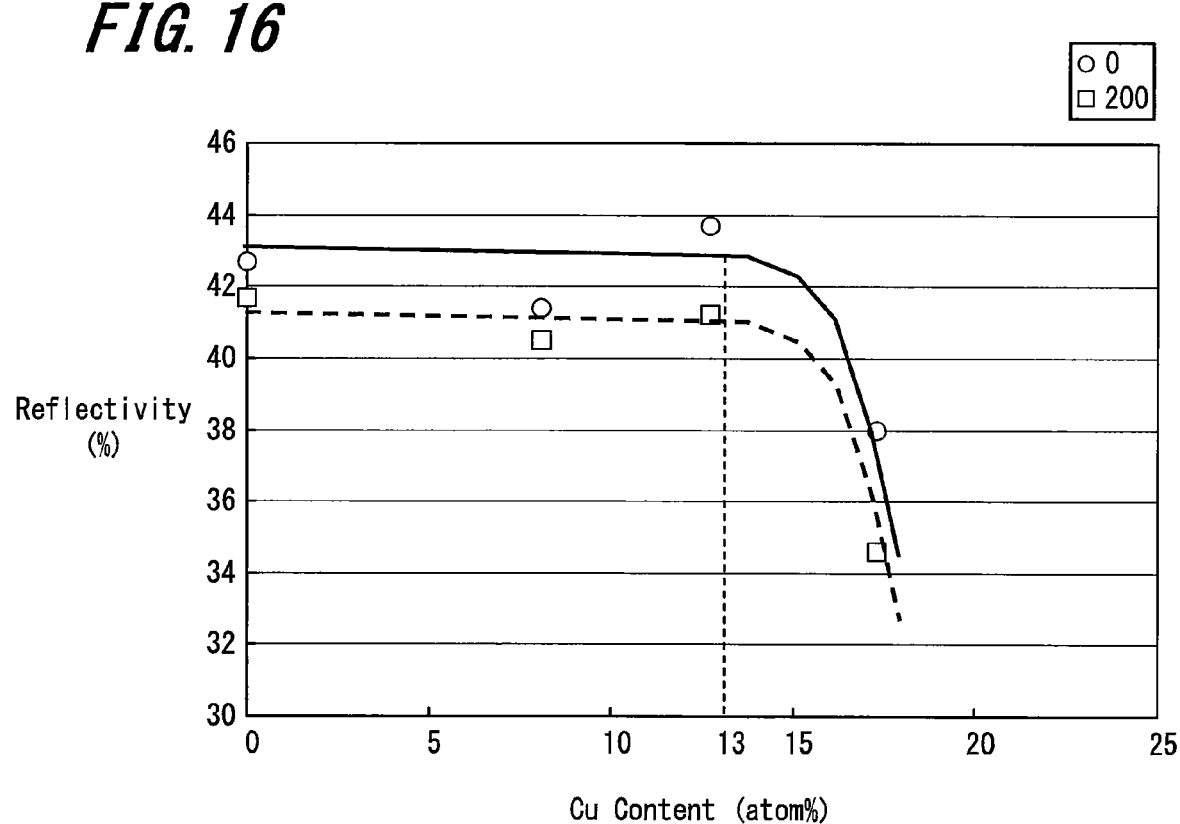
FIG. 16 is a diagram showing a relationship between Cu added amounts and reflectivity.

As shown in FIG. 16, an open circle corresponds to an initial characteristic and an open square corresponds to a reflectivity characteristic obtained at the constant-temperature and constant-humidity test (80° C. and 85%) after 200 hours. Upon adding Cu, the samples with the Cu content up to 12.7 atom % hardly have significant difference as compared to the sample without the Cu content. However, when the Cu content was more than 12.7 atom %, reflectivity was lowered due to the addition of Cu. While FIGS. 15A to 15D show the cases in which Ta is added other than Ag and Cu, it can be expected from the results of the samples 21, 22 and 23 that optical properties when Ag is replaced with Cu in the material composition according to an embodiment of the present invention, in which Sn and Nd of a small amount were added, may not vary much from the case in which Ta was added. Accordingly, it can be expected that, with the upper limit value of the Cu content according to an embodiment of the present invention being determined to 13 atom %, sufficient reflectivity characteristics can be maintained.

As shown in FIGS. 15A to 15D, the occurrence of Ag hillocks can be controlled in the material composition with the Cu content in the environmental test carried out under severe conditions without the protective layer. When the optical information recording medium is practically used, since the light transmissive layer functioning as the protective layer is formed on the reflective film having the material composition without the Cu content, moisture can be prevented from entering the optical information recording medium, and Ag hillocks are controlled so as not to occur. If Cu is added to the above-mentioned material composition, then the occurrence of Ag hillocks can be controlled more reliably and environmental storage properties can be improved.

Figure 13:
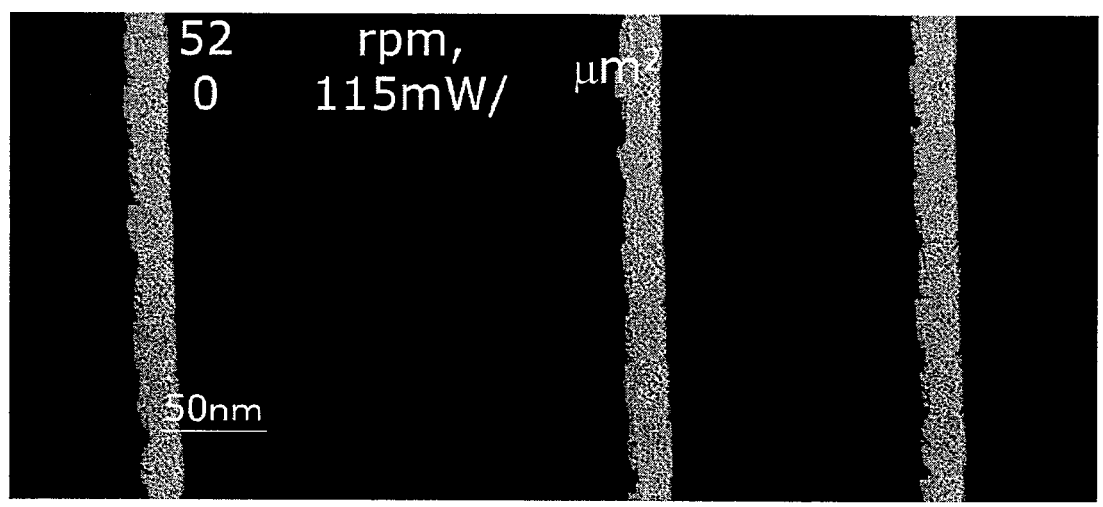
FIG. 13 is a microscopic representation of a BCA recording portion in an optical information recording medium of a comparative example.

FIG. 13 is a microscopic representation of a stripe in which a similar BCA signal is recorded on a reflective film formed of single substance of Ag for comparison. In this case also, the stripe was recorded by recording laser light having a wavelength of 810 nm. In this regard, a recording speed as low as 520 r.p.m. and recording power as high as 4.6 W (115 W/µm$^2$) may be required and the recorded stripe may not be sharp as compared to that of the embodiment of the present invention. That is, the jitter is increased.

As described above, according to an embodiment of the present invention, there can be formed an optical information recording medium which can satisfy the standards in which the reflectivity of the medium is sufficiently higher than 35% and the jitter value of the 17 pp modulation signal is 6.5% or less in the reproducing characteristics of the read-only information recording portion reproduced by blue-violet laser light. Further, the optical information recording medium is high in recording sensitivity in the recording characteristics of the BCA recording portion and has a small residue in the reproducing characteristics. Thus, there can be formed the highly-reliable optical information recording medium which can provide excellent signal quality.

Also, in the above-mentioned method of marking a BCA according to an embodiment of the present invention, since information is recorded on the optical information recording medium from the side opposite to the side in which blue-violet laser reproducing light is incident on the typical information recording portion such as the contents area and the lead-in area, regardless of the information recording layer being formed of the single layer or the multilayer, recording sensitivity of the laser marking, that is, the BCA signal can be made constant and the recording power of the BCA signal can be made the same power. Since the BCA signal recording apparatus and the recording operation can be simplified, it is advantages for industrial use.

It should be noted that, while the optical information recording medium is the ROM type optical information recording medium in the above-mentioned example, an embodiment of the present invention is not limited thereto and the following variant is also possible. That is, in a write-once optical information recording medium or a rewritable optical information recording medium, if a common reflective film in the BCA signal recording portion and the typical information recording portion has the composition similar to that of the above-mentioned reflective film 7, then it is possible to obtain an optical information recording medium having excellent recording and reproducing characteristics.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording medium comprising:
a read-only information recording portion; and
a BCA (Burst Cutting Area) portion formed by laser marking, wherein
a reflective film on an information recording surface of the read-only information recording portion and a reflective film on the BCA portion are formed of the same material,
composition of the reflective film includes Ag as a main component, and includes at least one of Nd and Gd, and at least one of Sn and In,
the composition of the reflective film includes at least one of Nd and Gd of 0.1 atom % or more and 3.0 atom % or less in total,
the composition of the reflective film includes at least one of Sn and In of 3 atom % or more and 12 atom % or less in total, and
recorded information is reproduced from the information recording surface of the read-only information recording portion and a BCA signal is reproduced from the BCA portion, using blue-violet laser reproducing light.

2. An optical information recording medium comprising:
a read-only information recording portion; and
a BCA (Burst Cutting Area) portion formed by laser marking, wherein
a reflective film on an information recording surface of the read-only information recording portion and a reflective film on the BCA portion are formed of the same material,
composition of the reflective film includes Ag as a main component, and includes at least one of Nd and Gd, at least one of Sn and In, and Cu,
the composition of the reflective film includes at least one of Nd and Gd of 0.1 atom % or more and 3.0 atom % or less in total,
the composition of the reflective film includes at least one of Sn and In of 3 atom % or more and 12 atom % or less in total,
the composition of the reflective film includes Cu of 1.3 atom % or more and 13 atom % or less, and
recorded information is reproduced from the information recording surface of the read-only information recording portion and a BCA signal is reproduced from the BCA portion, using blue-violet laser reproducing light.

3. An optical information recording medium according to claim 1, wherein:
the read-only information recording portion includes a multilayer information recording surface, each layer having the reflective film,
the reflective film on the information recording surface located at the deepest position from a reproducing-light incident surface of the optical information recording medium is formed of the same material as that of the reflective film on the BCA portion, the reflective films on the other information recording surfaces being semi-transparent,
the composition of the reflective film includes Ag as a main component and includes at least one of Nd and Gd, and at least one of Sn and In,
the composition of the reflective film includes at least one of Nd and Gd of 0.1 atom % or more and 3.0 atom % or less in total, and
the composition of the reflective film includes at least one of Sn and In of 3 atom % or more and 12 atom % or less in total.

4. An optical information recording medium according to claim 2, wherein:
the read-only information recording portion includes a multilayer information recording surface, each layer having the reflective film,
the reflective film on the information recording surface located at the deepest position from a reproducing-light incident surface of the optical information recording medium is formed of the same material as that of the reflective film on the BCA portion, the reflective films on the other information recording surfaces being semi-transparent,
the composition of the reflective film includes Ag as a main component and includes at least one of Nd and Gd, and at least one of Sn and In, and Cu,
the composition of the reflective film includes at least one of Nd and Gd of 0.1 atom % or more and 3.0 atom % or less in total,
the composition of the reflective film includes at least one of Sn and In of 3 atom % or more and 12 atom % or less in total, and
the composition of the reflective film includes Cu of 1.3 atom % or more and 13 atom % or less.

5. An optical information recording medium comprising:
an information recording portion including a single-layer or multilayer information recording surface having a reflective film, information being recorded on the information recording surface at least once, and a BCA (Burst Cutting Area) portion formed by laser marking, wherein
the reflective film on the single-layer information recording surface or the reflective film on the multilayer information recording surface located at the deepest position from a reproducing-light incident surface of the optical information recording medium is formed of the same material as that of the reflective film on the BCA portion,
composition of the reflective film includes Ag as a main component and includes at least one of Nd and Gd, and at least one of Sn and In,
the composition of the reflective film includes at least one of Nd and Gd of 0.1 atom % or more and 3.0 atom % or less in total,
the composition of the reflective film includes at least one of Sn and In of 3 atom % or more and 12 atom % or less in total, and
recorded information is reproduced from the information recording surface and a BCA signal is reproduced from the BCA portion, using blue-violet laser reproducing light.

6. An optical information recording medium comprising:
an information recording portion including a single-layer or multilayer information recording surface having a reflective film, information being recorded on the information recording surface at least once, and a BCA (Burst Cutting Area) portion formed by laser marking, wherein
the reflective film on the single-layer information recording surface or the reflective film on the multilayer information recording surface located at the deepest position from a reproducing-light incident surface of the optical information recording medium is formed of the same material as that of the reflective film on the BCA portion, composition of the reflective film includes Ag as a main component and includes at least one of Nd and Gd, at least one of Sn and In, and Cu, the composition of the reflective film includes at least one of Nd and Gd of 0.1 atom % or more and 3.0 atom % or less in total, the composition of the reflective film includes at least one of Sn and In of 3 atom % or more and 12 atom % or less in total, the composition of the reflective film includes Cu of 1.3 atom % or more and 13 atom % or less, and recorded information is reproduced from the information recording surface and a BCA signal is reproduced from the BCA portion, using blue-violet laser reproducing light.

7. A method of marking a BCA (Burst Cutting Area) with laser light into an optical information recording medium including a read-only information recording portion, and a BCA (Burst Cutting Area) portion formed by laser marking, a reflective film on at least one information recording surface of the read-only information recording portion and a reflective film on the BCA portion being formed of the same material, composition of the reflective film including Ag as a main component, and including at least one of Nd and Gd, and at least one of Sn and In, the composition of the reflective film including at least one of Nd and Gd of 0.1 atom % or more and 3.0 atom % or less in total, and the composition of the reflective film including at least one of Sn and In of 3 atom % or more and 12 atom % or less in total, the method comprising the step of:

irradiating the BCA portion with laser light for marking the BCA from the surface opposite to the surface on which blue-violet laser light is incident to reproduce information from the read-only information recording portion and the BCA portion of the optical information recording medium.

8. A method of marking a BCA (Burst Cutting Area) with laser light into an optical information recording medium including a read-only information recording portion, and a BCA (Burst Cutting Area) portion formed by laser marking, a reflective film on at least one information recording surface of the read-only information recording portion and a reflective film on the BCA portion being formed of the same material, composition of the reflective film including Ag as a main component, and including at least one of Nd and Gd, at least one of Sn and In, and Cu, the composition of the reflective film including at least one of Nd and Gd of 0.1 atom % or more and 3.0 atom % or less in total, and the composition of the reflective film including at least one of Sn and In of 3 atom % or more and 12 atom % or less in total, the composition of the reflective film including Cu of 1.3 atom % or more and 13 atom % or less the method comprising the step of:

irradiating the BCA portion with laser light for marking the BCA from the surface opposite to the surface on which blue-violet laser light is incident to reproduce information from the read-only information recording portion and the BCA portion of the optical information recording medium.

* * * * *